Sept. 27, 1955     H. L. BENNETT     2,718,767
SUNDAE-DISH HOLDER
Filed Aug. 8, 1952
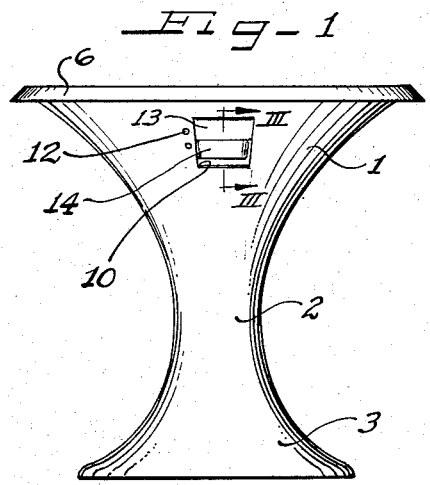
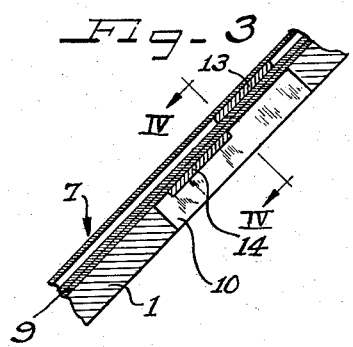
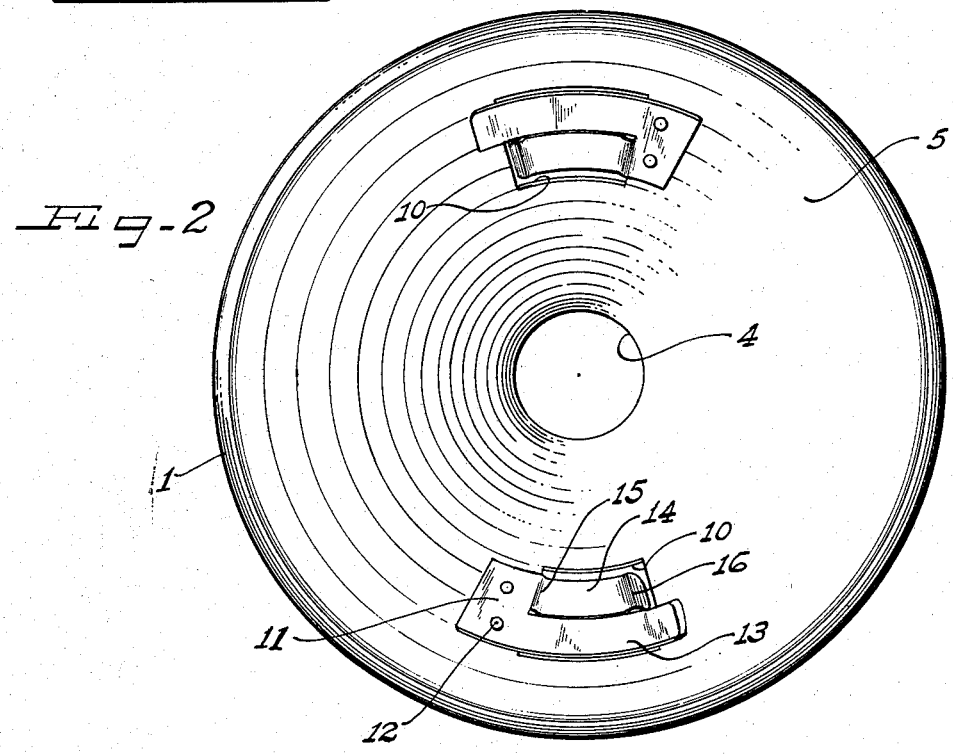
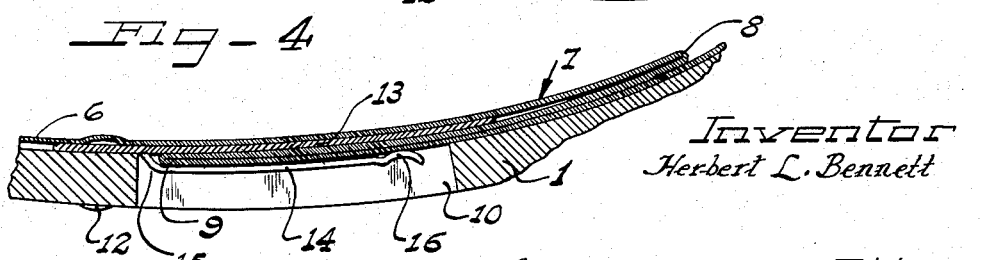
Inventor
Herbert L. Bennett

United States Patent Office 2,718,767
Patented Sept. 27, 1955

2,718,767
SUNDAE-DISH HOLDER

Herbert L. Bennett, Easton, Pa., assignor to Dixie Cup Company, Easton, Pa., a corporation of Delaware Application August 8, 1952, Serial No. 303,361

2 Claims. (Cl. 65—61)

This invention relates to improvements in sundae dish holders, and more particularly to a holder for a sundae dish made of paper or equivalently economical material, warranting the discarding of the dish after a single usage, although the invention may have other uses and purposes as will be apparent to one skilled in the art.

In the past, many and various types of sundae dish holders for confection receptacles made of paper have been provided. In most instances, the paper sundae dish is made from an initially substantially circular piece of stock, openly pleated in one or more locations to bring the blank into the shape of a relatively broad cone. The pleat is triple ply, and the holders have been provided with gripping means in the wall of the cup receiving cavity to engage one of the folds of the pleat and retain the dish in the holder before and during use. It has been customary to provide an inverted stack of nested dishes, hold the holder in the hand upside down, press it on the terminal dish of the stack, and rotate the holder until the retaining means engages the pleat of the dish, and then remove the dish in the holder without contacting the dish by the hands. In some locations open stacks of the dishes or cups is not permitted by sanitary requirements, and dispensers must be provided in order to close in the edges of the dishes until they are used.

Holders of this character heretofore known were objectionable in that they did not sufficiently firmly retain the dish. The engagement of the holder with the dish was not sufficient in many cases to withdraw the dish from a dispenser, because the pull upon withdrawal is axially of the dish, and the pleat in the dish is narrowing toward the apex of the dish. Also, holders heretofore known did not adequately retain the dish within the holder during use against the action of a spoon in removing ice cream, syrup, and the like, and the dish would frequently become free of the holder to the aggravation of the customer. In many cases, also, holders heretofore known embodied pleat gripping clips therein which were objectionably difficult to move into engagement with the pleats of a dish, requiring an objectionable amount of pressure for this purpose. In no instance of which I am aware, was there any form of holder provided wherein the gripping structure itself engaged both sides of a fold in the pleat so as to positively grip that fold.

With the foregoing in mind, it is an important object of the instant invention to provide a sundae dish holder capable of engaging a dish upon a partial revolution relatively thereto with sufficient force to permit extraction of the dish from a dispenser, even though that dispenser be equipped with dish holding jaws therein.

Also an object of this invention is the provision of a holder equipped with a gripping element designed to positively engage a tapering pleat in a conical paper dish with sufficient force to permit the withdrawal of that dish from a dispenser by virtue of an axial pull upon the dish.

A further object of the invention resides in the provision of a holder for a pleated paper dish, embodying gripping means therein which means in and of themselves engage opposite sides of a fold in the pleat.

Also a feature of the invention resides in the provision of a holder for a pleated paper dish, embodying a gripping element which is split to provide adjacent jaws, so arranged that one jaw will automatically engage a fold of the dish pleat on one side, while the other jaw engages on the opposite side of that fold, merely upon a partial revolution of the holder relatively to the dish.

Still a further feature of the invention resides in the provision of a paper dish holder equipped with gripping means having separated tongues so disposed that a fold in the dish is not only compressed or gripped between the gripping means and the wall of the holder, but opposite sides of the fold are gripped between the tongues of the gripping means, so that a positive hold is had upon the dish.

Still a further feature of the invention resides in the provision of a holder for paper dishes, the holder being equipped with very economical gripping means that are extremely easy to engage with a pleat in a paper dish.

While some of the more salient features, characteristics and advantages of the instant invention have been above pointed out, others will become apparent from the following disclosures, taken in conjunction with the accompanying drawing, in which—

Figure 1 is a side elevational view of a holder embodying principles of the instant invention, showing the same with a paper sundae dish held therein;

Figure 2 is a greatly enlarged top plan view, looking inside the holder, with the cup or dish removed;

Figure 3 is a greatly enlarged fragmentary sectional view taken substantially as indicated by the line III—III of Fig. 1, looking in the direction of the arrows; and Figure 4 is an enlarged fragmentary plan sectional view taken substantially as indicated by the line IV—IV of Fig. 3.

As shown on the drawings:

The illustrated embodiment of this invention comprises a holder including a body portion 1, a throat 2, and a base 3. In the illustrated instance, the entire holder is of integral construction, but it will be understood that the body and base portions may be initially separate and connected together in the throat region in any suitable manner, if so desired. The holder is preferably tubular, having an opening 4 (Fig. 2), extending therethrough in order to satisfy sanitary requirements in all locations. The holder may be made of a suitable thermosetting plastic material, metal, or any other suitable substance.

Within the body portion, there is a cup or dish receiving cavity 5, and in the illustrated instance the inside wall of the holder body has a taper to intimately fit the side wall of the particular dish, the apical portion of the dish extending through the opening 4 in the throat of the holder.

In Fig. 1, a paper dish 6, having a downwardly inclined rim around the mouth is disposed in operative position in the holder. This dish is shown by way of example and not by way of limitation, since various conical dishes, with or without such a rim may be used with the holder. As seen in Figs. 3 and 4, this dish has an open pleat generally indicated by numeral 7, in the wall thereof, which pleat transforms the initially flat circular blank into the conical vessel without the aid of adhesive or other holding material. The pleat is triple ply in thickness and includes two opposite reverse folds in the material, 8 and 9. Obviously, the pleat is widest at the mouth of the vessel, and narrows to the apex.

At diametrally opposite points, the body portion of the holder is provided with apertures 10—10 through the wall thereof, and inside the holder adjacent each aperture is a gripping element. Two gripping elements are provided as a desirable construction, because some paper cups are made with triple ply pleats on opposite sides thereof, and a gripping element is then in engagement with each pleat. Where a cup has only one pleat in the wall thereof, the holder need not be rotated relatively to the cup any more than less than one half a revolution before one of the gripping elements has engaged that pleat.

Both gripping elements being identical, only one need be described herein. A gripping element may consist of a base portion 11 secured to the holder in any suitable manner such as by rivets 12. The gripping element is initially one piece, and is a simple form of stamping. The initially one piece structure is split from one end to the base portion to define a pair of separate resilient tongues or blades 13 and 14, which tongues are curvate in keeping with the contour of the wall of the cavity 5.

The upper blade 13 preferably extends circumferentially across the respective aperture 10 to slightly overlie the adjacent wall portion on the far side of the opening, and is given a curvature slightly less in radius than the adjacent wall portion, or the free end thereof is turned inwardly so as to provide a space between the free end of the tongue and the adjacent wall for the reception of the reverse fold 9 in the dish pleat.

The lower and shorter tongue 14 is bent at 15 so that it extends into the respective aperture 10, and the free end of this tongue is again bent as indicated at 16 so that this end turns outwardly to guide the reverse fold 9 of the dish pleat 7 between the blade 14 and the tongue or blade 13.

The opening 10 not only facilitates the entrance of a pleat between the blades, but also the cleansing of the blades, if and when necessary.

Of course, when the reverse fold portion 9 of the dish pleat is engaged between the blades or tongues of the gripping element, as seen in Fig. 4, the blade 13 is urged inwardly away from the holder wall against its inherent resiliency, and the blade 14 is likewise urged outwardly against its inherent resiliency. Obviously, therefore, since the blades 13 and 14 are laterally separated by the reverse fold 9 of the pleat, these blades will exert a positive gripping action upon the pleat, and yet by virtue of the above described construction of the blades, the fold of the pleat may enter between them very expeditiously and very easily. It is a simple expedient to place the holder in inverted position over a stack of inverted cups, or in erect position over the lowermost cup of a stack of cups contained in a vertical dispenser, as the case may be, rotate the holder a partial revolution relatively to the terminal dish until the gripping blades have engaged the pleat, and withdraw the dish in the holder. While the engagement of the gripping blades upon the pleat of a dish is much more positive than any construction heretofore developed, it is in fact easier to effect such engagement than with structures heretofore developed. The engagement is sufficiently secure to hold the dish while it is withdrawn from a dispenser, even against the action of dispenser jaws, and sufficient to hold the dish more positively than heretofore known during the consumption of the contents of the dish with the aid of a spoon or other eating implement. When it is desired to discard the dish, it is a simple expedient for the operator to rotate the dish very slightly until the pleat is released from between the blades 13 and 14, and then discard the dish. It will be noted that the structure herein set forth is economical, both to manufacture and use, contains no parts to become out of order unless deliberately abused, presents a pleasing appearance, and is easily and readily cleansed when necessary.

It will be understood that modifications and variations may be effected without departing from the scope of the novel concepts of the present invention.

I claim as my invention:

1. In a holder for a pleated paper dish, a body portion having a cavity therein to receive a dish and a single opening in the side wall of the cavity, and gripping means on the wall of said cavity including a pair of adjacent resilient blades both overlying said opening and one having an inwardly turned end and one having an outwardly turned end to frictionally receive therebetween a fold in the wall of the dish.

2. In a holder for a pleated paper dish, a body portion having a cavity therein to receive a dish, a gripping element on the wall of said cavity including a base part secured to the wall and a free portion split to define a pair of adjacent blades extending generally parallel to the cavity wall and arranged to engage opposite sides of a fold in the dish wall.

References Cited in the file of this patent

UNITED STATES PATENTS

| | | |
|---|---|---|
| 1,489,698 | Curtain | Apr. 8, 1924 |
| 1,762,977 | Green | June 10, 1930 |
| 2,414,920 | Amberg | Jan. 28, 1947 |
| 2,483,166 | Amberg | Sept. 27, 1949 |
| 2,483,167 | Amberg | Sept. 27, 1949 |
| 2,543,619 | Amberg | Feb. 27, 1951 |
| 2,552,474 | Amberg | Mar. 8, 1951 |

FOREIGN PATENTS

| | | |
|---|---|---|
| 413,744 | Germany | May 15, 1925 |